(12) United States Patent
Behling (10) Patent No.: US 12,091,828 B2
(45) Date of Patent: Sep. 17, 2024

(54) SHEET FOR A MINE FLOOR OR A ROAD, AND METHOD

(71) Applicant: Joshua Stephen Behling, Vineyard, UT (US)

(72) Inventor: Joshua Stephen Behling, Vineyard, UT (US)

(73) Assignee: Strata Products Worldwide, LLC, Sandy Springs, GA (US)

( * ) Notice: Subject to any disclaimer, the term of this patent is extended or adjusted under 35 U.S.C. 154(b) by 439 days.

(21) Appl. No.: 16/821,576

(22) Filed: Mar. 17, 2020

(65) Prior Publication Data

US 2020/0256019 A1    Aug. 13, 2020

Related U.S. Application Data

(63) Continuation-in-part of application No. 15/993,018, filed on May 30, 2018, now Pat. No. 10,550,695.

(60) Provisional application No. 62/820,681, filed on Mar. 19, 2019.

(51) Int. Cl.
| | |
|---|---|
| *E01C 5/20* | (2006.01) |
| *B29C 39/02* | (2006.01) |
| *B29C 39/10* | (2006.01) |
| *B29C 39/24* | (2006.01) |
| *E01C 3/00* | (2006.01) |
| *E01C 3/06* | (2006.01) |
| *B29L 7/00* | (2006.01) |

(52) U.S. Cl.
CPC .............. *E01C 3/006* (2013.01); *B29C 39/02* (2013.01); *B29C 39/10* (2013.01); *B29C 39/24* (2013.01); *E01C 3/06* (2013.01); *E01C 5/20* (2013.01); *B29L 2007/002* (2013.01)

(58) Field of Classification Search
CPC ... E01C 3/006; E01C 3/06; E01C 5/08; E01C 5/20; E04C 2/205; E04C 2/22; E04C 5/01; Y10T 428/249953; Y10T 428/249976; Y10T 428/249977; Y01T 428/249953
USPC ..................... 404/45; 52/309.4, 309.7, 649.1
See application file for complete search history.

(56) References Cited

U.S. PATENT DOCUMENTS

| | | | | |
|---|---|---|---|---|
| 3,731,449 A | * | 5/1973 | Kephart, Jr. ............. | E04C 2/40 52/309.7 |
| 5,834,082 A | * | 11/1998 | Day ....................... | E04C 2/296 428/56 |
| 6,235,367 B1 | * | 5/2001 | Holmes ..................... | E04C 2/22 52/309.7 |
| 6,455,127 B1 | * | 9/2002 | Valtanen ................... | B32B 5/18 428/137 |
| 6,898,908 B2 | * | 5/2005 | Messenger ................ | E04C 2/06 52/406.1 |
| 7,264,878 B2 | * | 9/2007 | Miller ..................... | B32B 5/245 428/408 |
| 7,972,698 B2 | * | 7/2011 | Miller .................. | C04B 38/0032 428/408 |
| 9,447,547 B2 | * | 9/2016 | Penland, Jr. ............. | E01C 5/18 |

(Continued)

FOREIGN PATENT DOCUMENTS

| | | | | | |
|---|---|---|---|---|---|
| AU | 2004219602 A1 | * | 9/2004 | ......... | B29C 44/5618 |
| KR | 20020067556 A | * | 8/2002 | | |

*Primary Examiner* — Frederick L Lagman
(74) *Attorney, Agent, or Firm* — Ansel M. Schwartz (57) ABSTRACT

A sheet for forming a floor in a mine or for forming a road on permafrost. A method for making a sheet that is a closed foam celled sheet. A system for making a sheet.

13 Claims, 9 Drawing Sheets

(56) References Cited

U.S. PATENT DOCUMENTS

| | | | | |
|---|---|---|---|---|
| 2007/0250025 A1* | 10/2007 | Sams | ................ | E01C 9/086 |
| | | | | 604/385.01 |
| 2009/0308001 A1* | 12/2009 | Wu | ................ | E04F 13/0885 |
| | | | | 52/173.3 |
| 2013/0170907 A1* | 7/2013 | Gunn | ................ | E01C 9/08 |
| | | | | 404/36 |
| 2014/0205377 A1* | 7/2014 | Hill | ................ | E21B 41/00 |
| | | | | 404/35 |
| 2016/0138267 A1* | 5/2016 | Ettinger | ................ | C08G 18/6662 |
| | | | | 521/110 |
| 2017/0225428 A1* | 8/2017 | Muir | ................ | B32B 27/16 |
| 2019/0211557 A1* | 7/2019 | Moghaddam | ................ | E04C 2/284 |

* cited by examiner

SHEET FOR A MINE FLOOR OR A ROAD, AND METHOD

CROSS-REFERENCE TO RELATED APPLICATIONS

This is a nonprovisional of U.S. provisional application Ser. No. 62/820,681 filed Mar. 19, 2019, and is a continuation-in-part of U.S. patent application Ser. No. 15/993,018 filed May 30, 2018, now U.S. Pat. No. 10,550,695 issued Feb. 4, 2020, all of which are incorporated by reference herein.

FIELD OF THE INVENTION

The present invention is related to a closed foam celled sheet that is used to form a floor or road. (As used herein, references to the "present invention" or "invention" relate to exemplary embodiments and not necessarily to every embodiment encompassed by the appended claims.)

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

In mines, because of the soft bottom inherent in the mines, the floor commonly deteriorates under the compressive forces of the loads that are carried on the floor over time. The floor must often be cleaned and leveled to allow effective access into and out of the mine. Concrete slabs are used to reinforce the floor and form the floor to allow the floor to better be maintained to allow the mining process to proceed.

Similarly, in the Arctic, there is a need to protect the permafrost. The basic problem is during the few summer months that oil rigs are running and moving from location to location, the top several feet of permafrost thaws out and the large equipment sinks into the permafrost. Additionally, because of the isolated location of the Arctic, it is very expensive to transport concrete slabs or similar types of boards to try to construct a secure firm surface on the permafrost that will support the oil rigs as they are moved on the permafrost. Furthermore, in the Arctic, it is common for there to be high winds, between 30 mph and 60 mph, which makes it extremely difficult to position preformed structures to create a secure firm surface on the permafrost.

BRIEF SUMMARY OF THE INVENTION

The present invention pertains to a sheet. The sheet comprises a top surface, a bottom surface, a first side and a second side, and a closed foam celled core between the top surface and the bottom surface and the first side and the second side. The core supports at least 1000 psi of compressive force before cracking or failing. The top surface is at least 2 feet wide by 4 feet long. The sheet weighs less than 40 lbs.

The present invention pertains to a sheet. The sheet comprises a top surface, a bottom surface, a first side and a second side, and a closed foam celled core between the top surface and the bottom surface and the first side and the second side. The core supports at least 1000 psi of compressive force before cracking or failing. The top surface is at least 40 yards long and 6 feet wide and is one continuous piece.

The present invention pertains to a method of producing a sheet. The method comprises the steps of feeding under a pressure of at least 100 psi a first fluid material into a first input port of a Y junction. There is the step of feeding under a pressure of at least 100 psi a second fluid material into a second input port of the Y junction. There is the step of directing the first fluid material and the second fluid material together out an output port of the Y junction into a conduit. There is the step of mixing the first and second fluid materials in the conduit into a mixture as the first and second fluid materials flow through the conduit to a spray bar. There is the step of spraying the mixture out nozzles in the spray bar to form a sheet with a closed foam celled core that supports at least 1000 psi of compressive force before cracking or failing.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
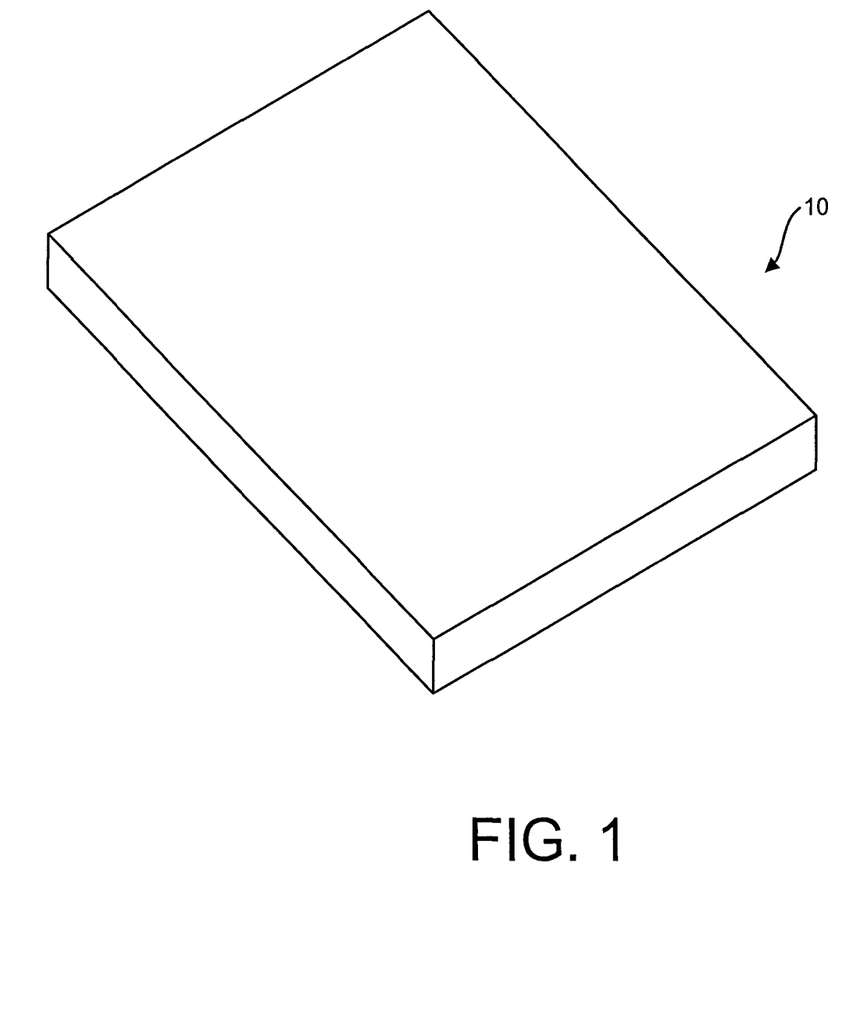
FIG. 1 shows a sheet of the present invention.

Referring now to the drawings wherein like reference numerals refer to similar or identical parts throughout the several views, and more specifically to FIG. 1 thereof, there is shown a sheet 10. The sheet 10 comprises a top surface 12, a bottom surface 14, a first side 16 and a second side 18, and a closed foam celled core 20 between the top surface 12 and the bottom surface 14 and the first side 16 and the second side 18. The core 20 supports at least 1000 psi of compressive force before cracking or failing. The top surface 12 is at least 2 feet wide by 4 feet long. The sheet 10 weighs less than 40 lbs. Preferably, the core includes Dibutyltin dilaurate, and Diphenylmethane and is phthalate free. The sheet is preferably of a rectangular shape in the form of a plate having a flat top surface 12, and a flat bottom surface 14. The first side 16 and the second side 18 may be flat too.

Figure 2:
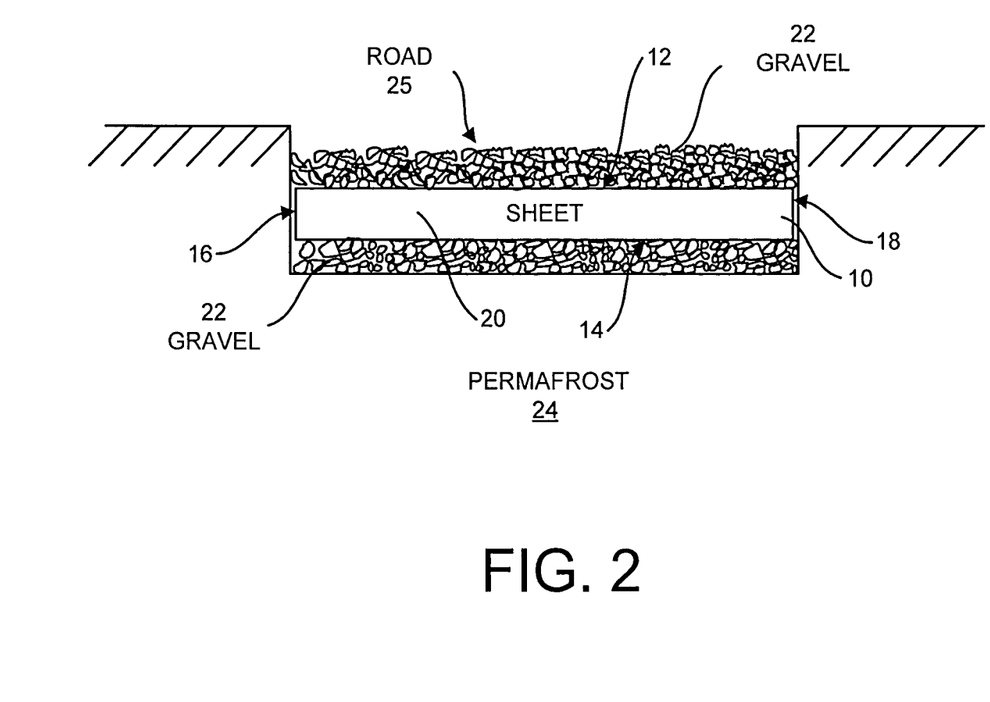
FIG. 2 shows a cross-sectional view of a road of the present invention on permafrost.

The present invention pertains to a sheet 10, as shown in FIG. 2. The sheet 10 comprises a top surface 12, a bottom surface 14, a first side 16 and a second side 18, and a closed foam celled core 20 between the top surface 12 and the bottom surface 14 and the first side 16 and the second side 18. The core 20 supports at least 1000 psi of compressive force before cracking or failing. The top surface 12 is at least 40 yards long and 6 feet wide and is one continuous piece.

Figure 4:
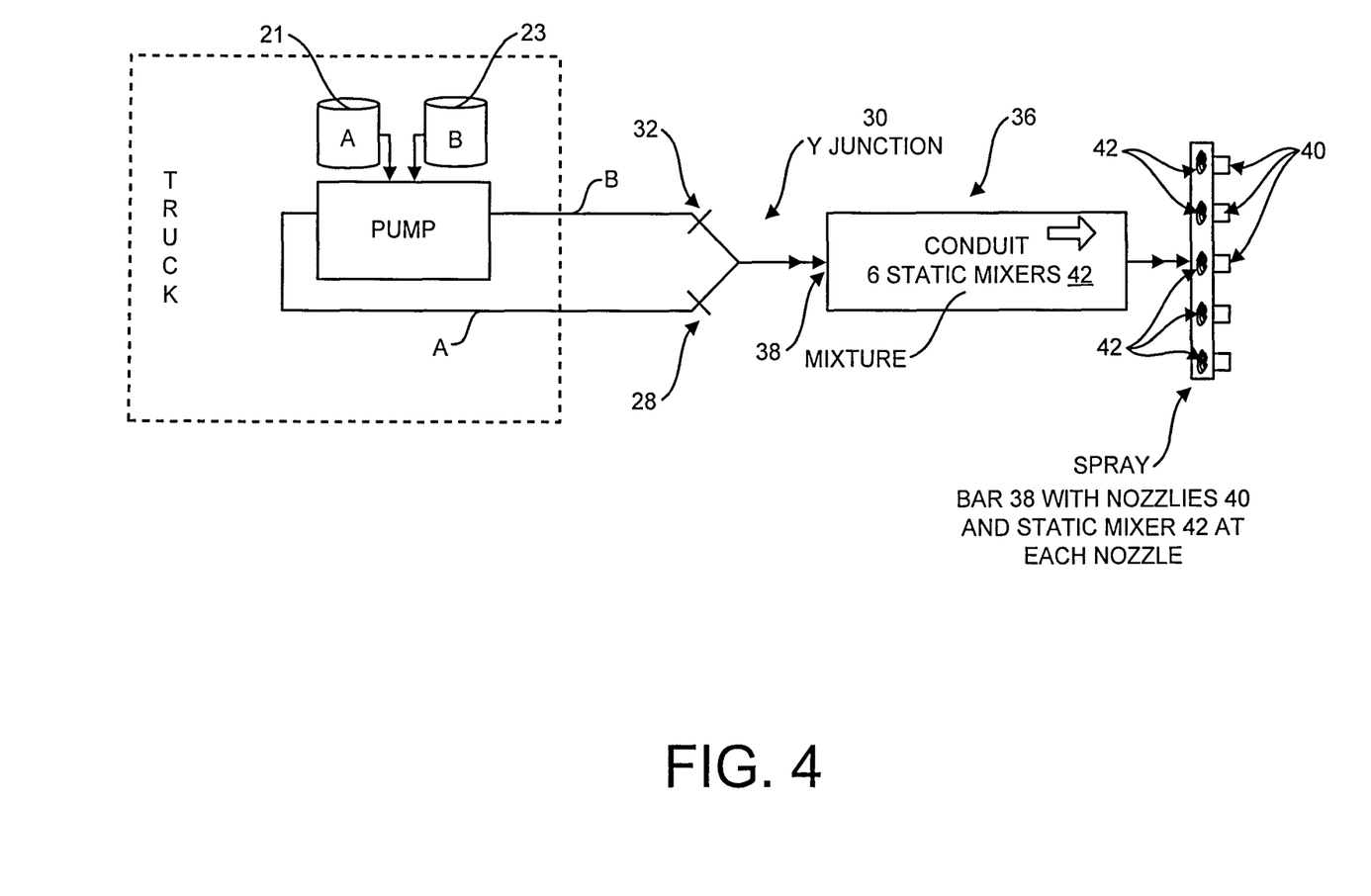
FIG. 4 is a schematic representation of an apparatus of the present invention.

The present invention pertains to a method of producing a sheet 10. The method comprises the steps of feeding under a pressure of at least 100 psi a first fluid material 21 into a first input port 28 of a Y junction 30. There is the step of feeding under a pressure of at least 100 psi a second fluid material 23 into a second input port 32 of the Y junction 30. There is the step of directing the first fluid material and the second fluid material together out an output port 34 of the Y junction 30 into a conduit 36. There is the step of mixing the first and second fluid materials in the conduit 36 into a mixture as the first and second fluid materials flow through the conduit 36 to a spray bar 38. There is the step of spraying the mixture out nozzles 40 in the spray bar 38 to form a sheet 10 with a closed foam celled core 20 that supports at least 1000 psi of compressive force before cracking or failing.

Figure 3:
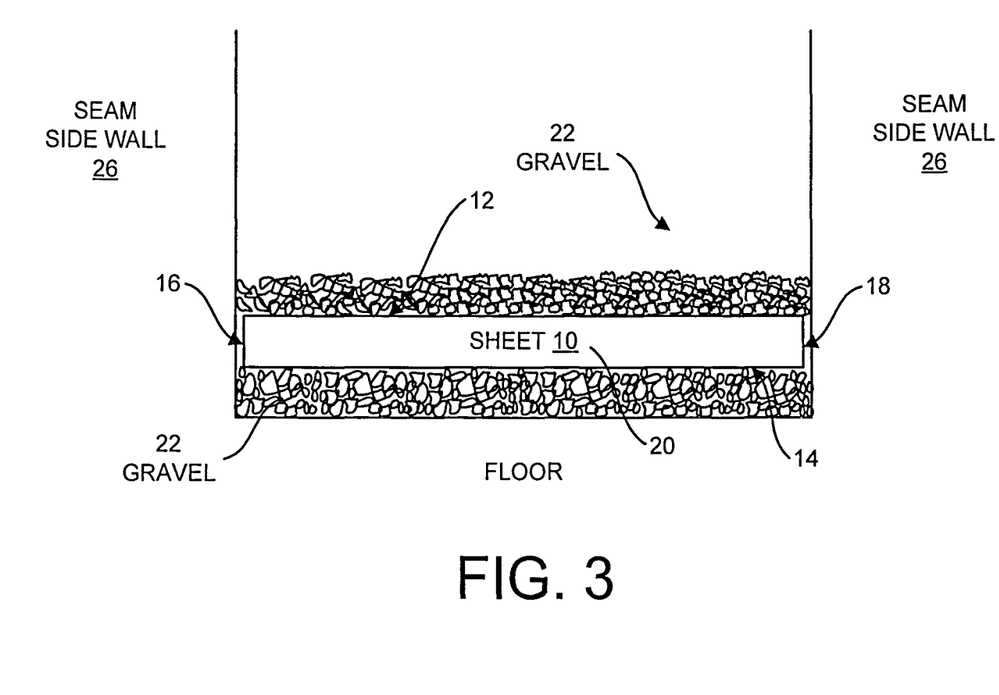
FIG. 3 shows a cross-sectional view of a road of the present invention in a mine.

In the operation of the invention, and with reference to FIG. 3, when creating a floor for a mine, for instance to consolidate the floor for moving a longwall, the floor is leveled and cleaned from sidewall 26 to sidewall 26. If the floor is not able to be leveled, gravel 22 is placed on the floor, a couple inches thick, to level the floor. 4'×8' closed foam celled sheets are placed alongside each other on the gravel 22 to provide a support layer to the floor. The sheets are about 3.5 to 4 inches thick, weigh about 50 lbs. and cures to support a minimum 2000 psi load and supports at minimum a 120 psi point load. Next, 8 to 12 inches of gravel 22 are placed on the sheets to form a wear surface for the floor and to disperse loads across the floor. The bare or unprepared floor in a mine is commonly made of soft gravel 22 with a little bit of clay and little or no water. By placing the preformed sheets into the mine, there is no need to be concerned with the presence of water affecting the formation of the sheet 10, if the sheet 10 were instead to be formed by being sprayed on site in the mine. In the event the width between the sidewalls 26 is less than the width of the sheet 10, the sheet 10 width is cut to size to fit the width between the sidewalls 26. A standard handsaw can be used to easily cut the sheet 10.

In the Arctic, and with reference to FIG. 2, a path of a road 25 is cut into the permafrost 24 that is typically 8 to 10 feet wide, with defined side walls, either from the ground itself being dug out, or with lumber defining the sidewalls 26 in the ground that has been bulldozed or plowed where the road 25 will be formed. If desired, a few inches of gravel 22 can be placed on the path that has been cut out for the road 25 to ensure the road 25 is level. A spray bar 38 approximately the width of the road 25, with nozzles 40, is used to spray the mixture that forms the closed foam celled sheet 10 continuously on the path cut out for the road 25. The spray bar 38 is slowly moved along the road 25, about 1 to 2 mph, with the mixture continuously being sprayed under a pressure of about 100 psi and sprays about 40 liters a minute of mixture. As the mixture sprays from the spray bar 38, and covers the path, the mixture immediately starts curing and solidifying and forms the continuous closed foam celled sheet 10 of about 3.5-4 inches thick, and which supports compressive loads of about 2000 psi. The pump to power the spray can be placed on a truck, and the components that form the mixture stored in drums in the truck. The components are poured into the pump, as needed, as the truck moves along the path, and the mixture is sprayed onto the path to form a support structure for the road 25. The road 25 can be as long as is necessary, with the sheet 10 essentially being one continuous long piece that is formed from the spraying operation and about 8' to 12' wide. Once the sheet 10 is formed, a wear surface of gravel 22, of about 8 to 12 inches thick is placed over the cured sheet 10, to protect the sheet 10 and disperse loads across sheet 10.

To produce the closed foam celled sheet 10, whether as 4-foot by 8-foot boards, or as a continuous long sheet 10 for a road 25, two components are used to form the mixture. The first component is a first fluid material 21, ROCKSTAB™ 1.2 Component A, which is more fully described in the Safety Data Sheet for the same and incorporated by reference herein, and the second component is a second fluid material 23, ROCKSTAB™ 1.2 Component B, which is more fully described in the Safety Data Sheet for the same and incorporated by reference herein. ROCKSTAB™ 1.2 Components A and B are available to the public for purchase from GCP Applied Technologies Inc., of Cambridge Mass. See also Technical Data Sheet ROCKSTAB™ Series 1.2, 1.3, 1.4 of GCP Applied Technologies, Inc., incorporated by reference herein. The first component and the second component are supplied in drums. A drum of each component is poured into the corresponding section of a pump. See FIG. 4. The pump pumps the first component at about 100 psi out a first pump line of the pump to a first input port of a Y junction 30 to which the first pump line is fluidically connected. The pump pumps the second component at about 100 psi out a second pump line of the pump to a second input port 32 of the Y junction 30 to which the second pump line is fluidically connected. Under the action of the pump, the first component and the second component are combined in the Y junction 30 and flow out of an output port 34 of the Y junction 30 to a conduit 36, that is about 20 feet long, that is fluidically connected to the output port 34 of the Y junction 30. In the conduit 36, in series, are positioned six static mixers 42 that cause the first component and the second component to be mixed together into a mixture as the first component and the second component flow through the mixers 42 in the conduit 36 under the action of the pump. The other end of the conduit 36 is attached to a spray bar 38 that has 4-7 nozzles 40, depending on the width of the spray bar 38. The spray bar 38 is typically 8 to 12 feet long to accommodate the width of the sheet 10 that is being produced. The nozzle 40 that is used is a B D-4 spray nozzle 40. In the spray bar 38, just in front of each nozzle 40, is positioned another static mixer 42 to ensure the first component and the second component are fully mixed together. In this way, the mixture of the first component and the second component pass through a total of 7 static mixers 42 before being sprayed out of a spray nozzle 40. If the temperature is below about 40° F., the drums should be heated so the first component and the second component is above 40° F. when poured into the pump. As the sprayed mixture is sprayed out of the nozzles 40 and lands on the ground, it immediately starts curing. The flow rate is high enough at 40 liters per minute to create a continuous complete layer of mixture that cures into the closed foam celled sheet 10 which is 3.5-4 inches thick.

Figure 5:
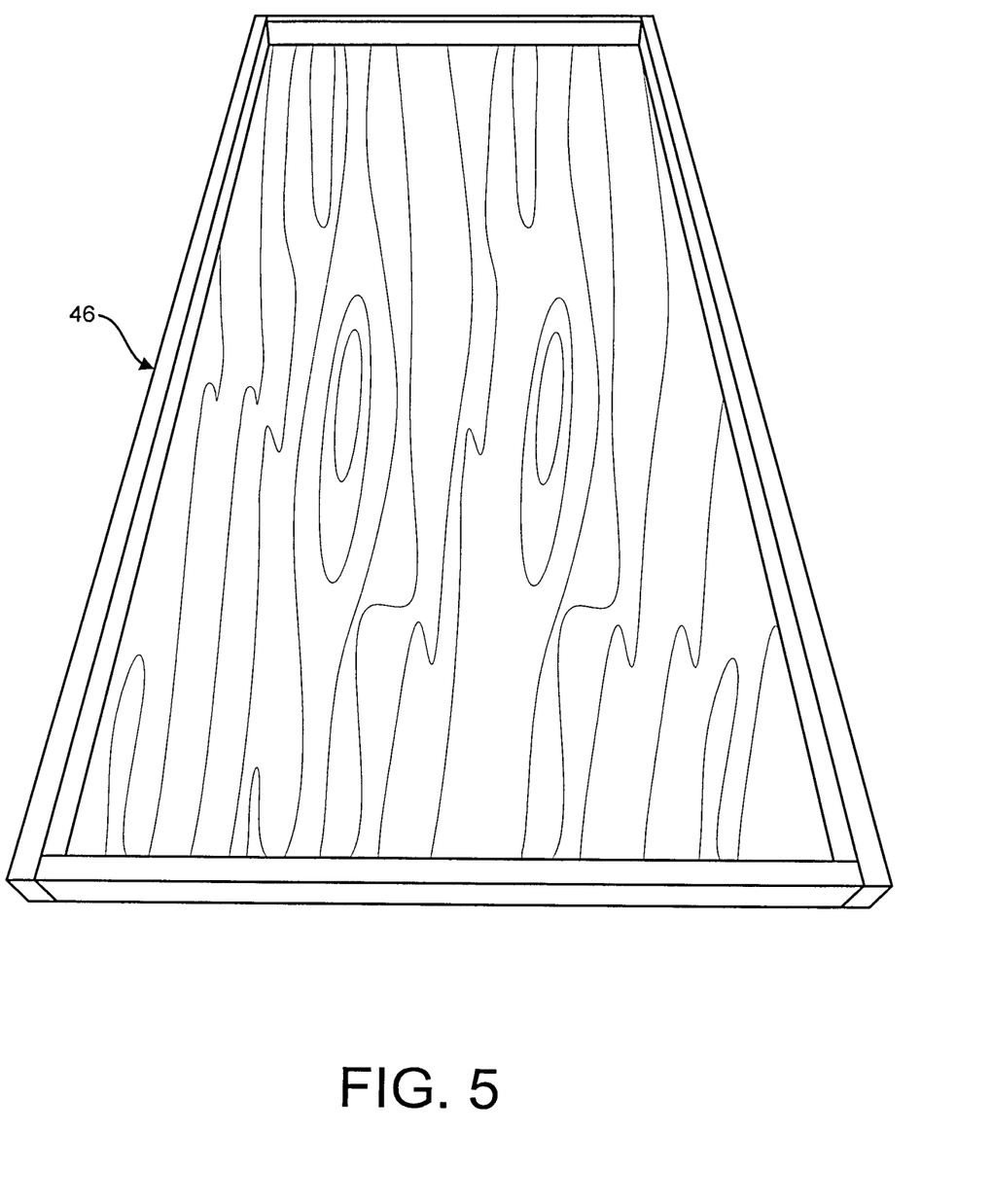
FIG. 5 shows a mold.
Figure 6:
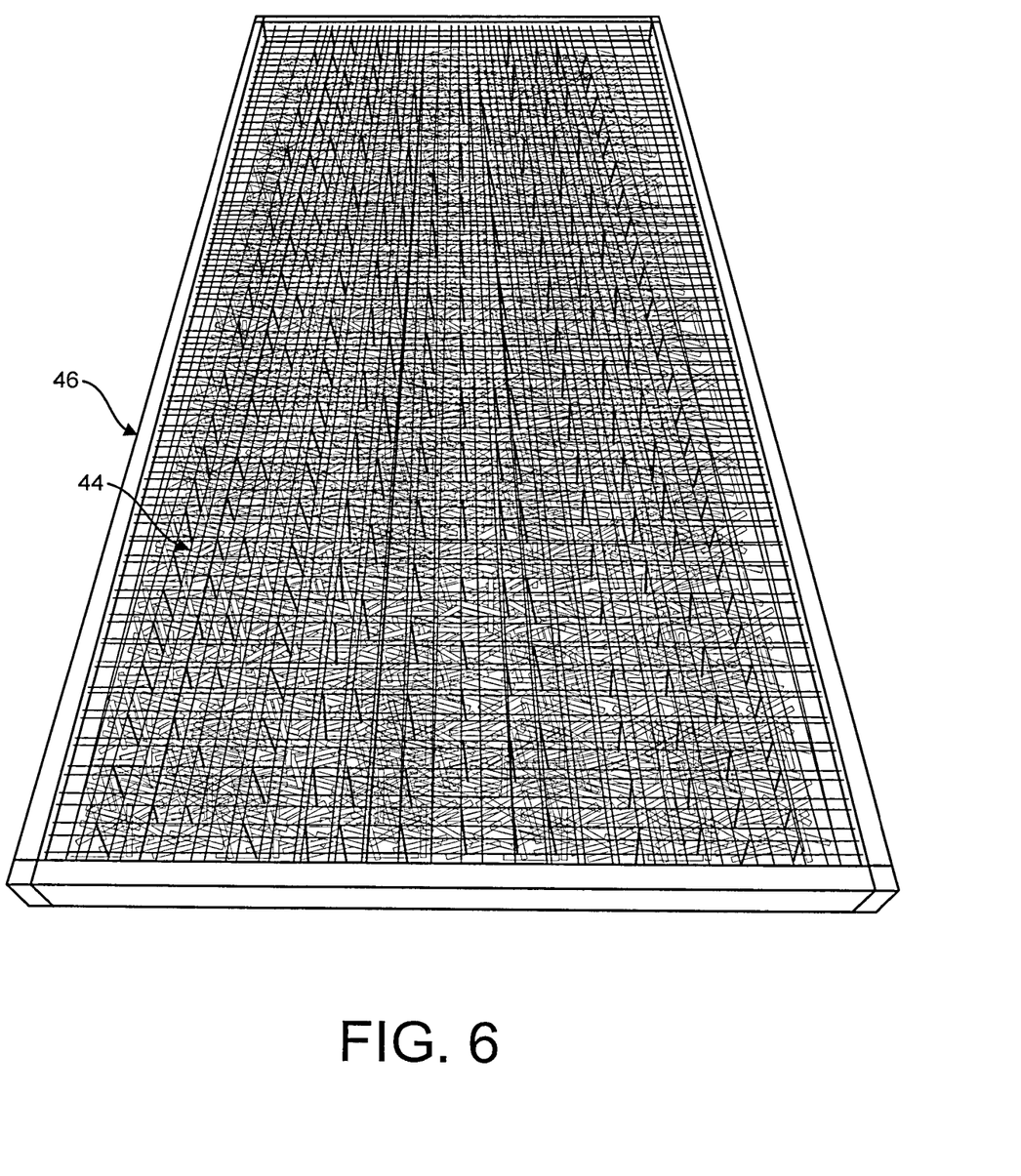
FIG. 6 shows a mold with a cage.
Figure 7:
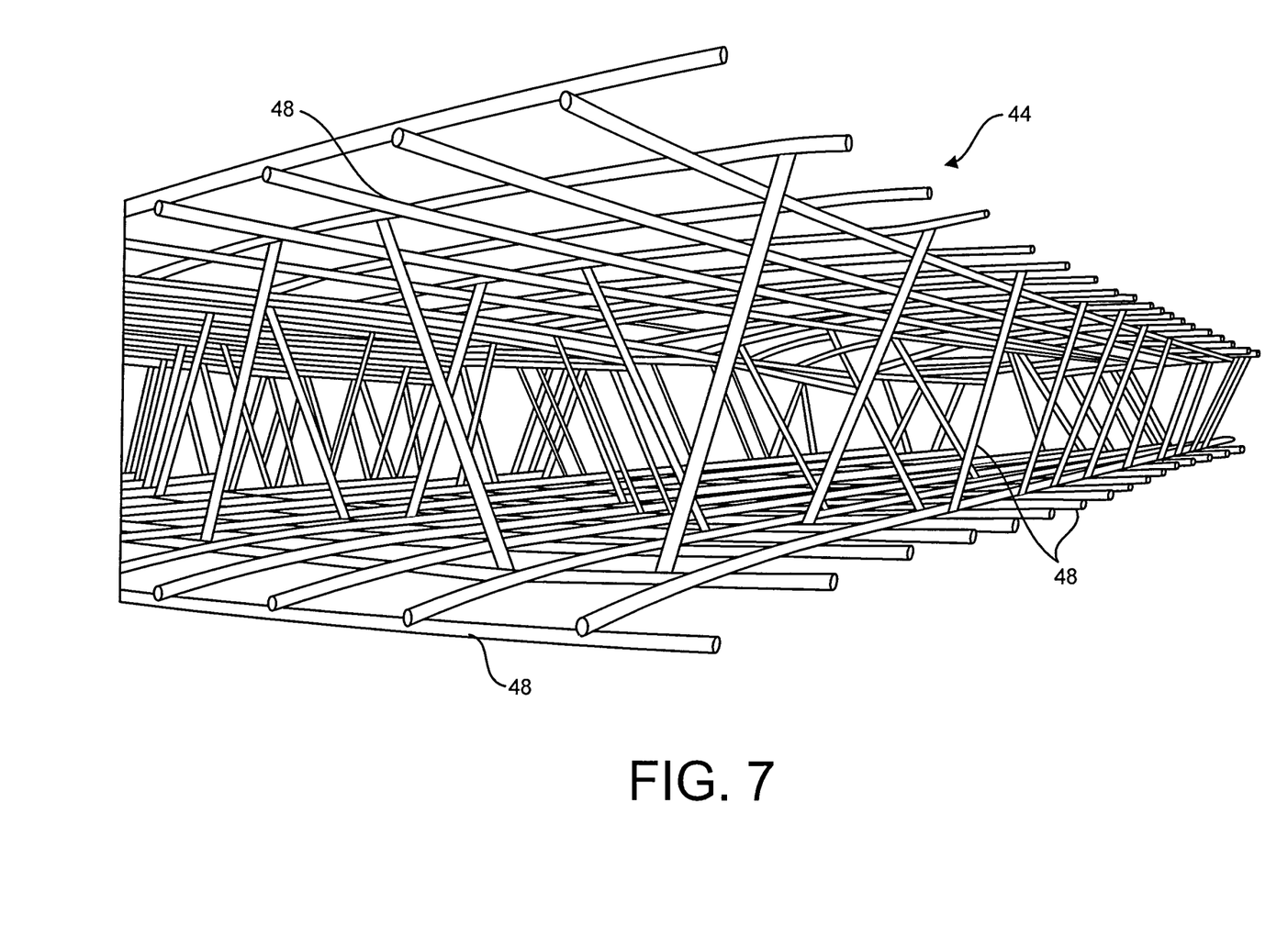
FIG. 7 shows a side view of a cage.
Figure 8:
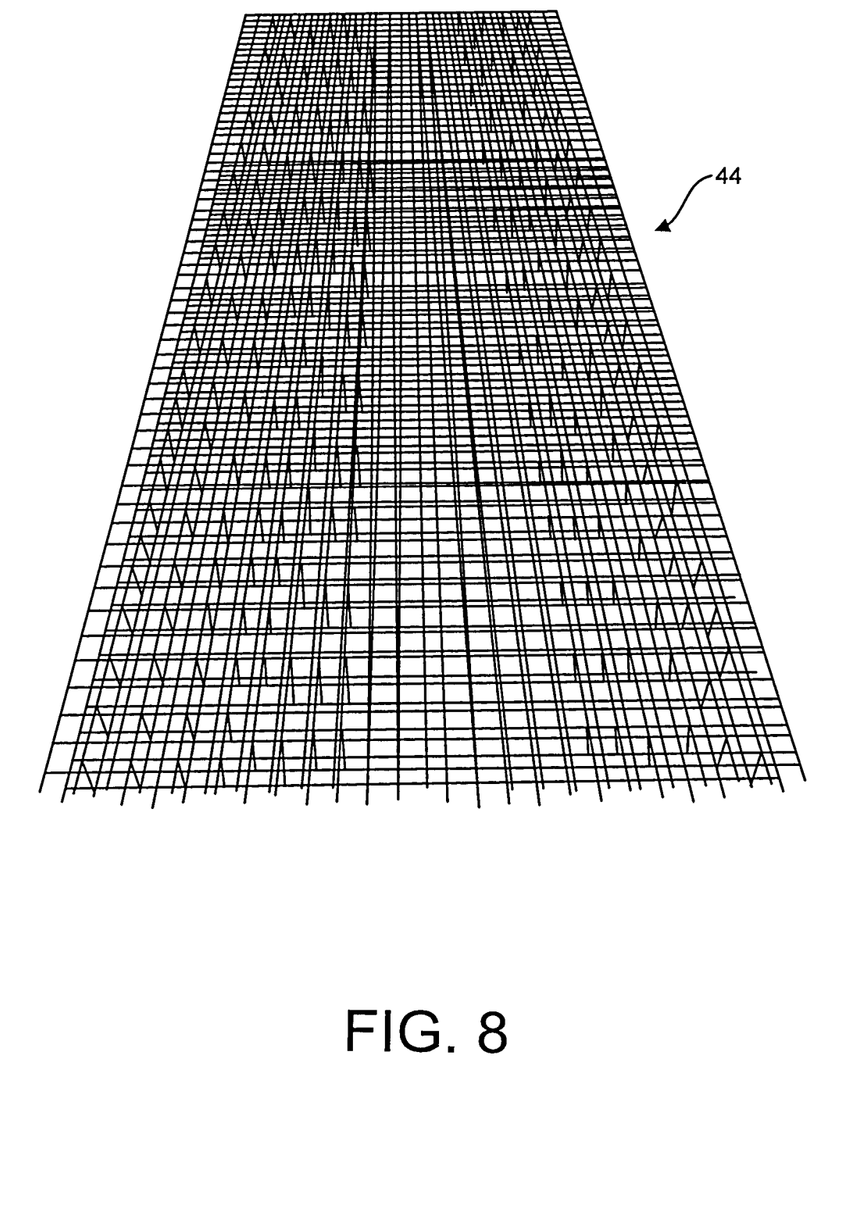
FIG. 8 shows a perspective view of a cage.
Figure 9:
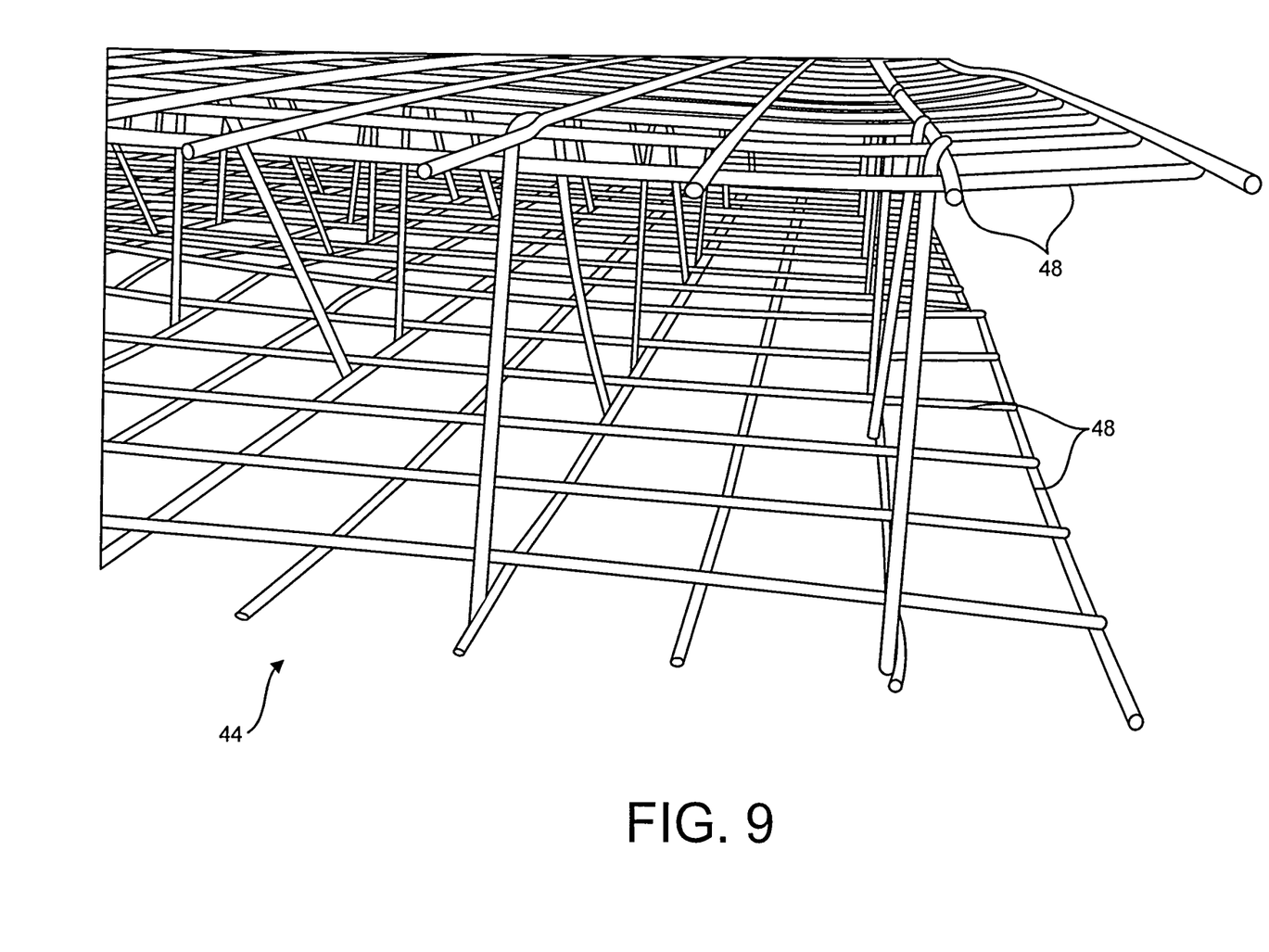
FIG. 9 shows a portion of a side perspective view of a cage.

Each sheet 10 may be formed in a mold 46, as shown in FIG. 5, that is rectangular in shape and has an inner circumference of about 4'×8', and a depth of about 4 inches. The mold 46 can be made out of plastic, wood or metal. If desired, to further strengthen the sheet 10, an insert such as metal wiring in a shape of a metal cage 44, as shown in FIGS. 7-9, may be present in the sheet 10. In this embodiment, the cage 44 is placed in the mold 46, as shown in FIG. 6. The cage 44 is about 4 feet wide by 8 feet long so that it fits into the mold 46, and has a depth of about 4 inches. The spraying operation then proceeds as described above, with the mixture filling the mold 46 and engulfing the cage 44. The cage 44 is formed of metal wires 48 in a rectangular lattice structure, with wires 48 positioned long wise and with wise perpendicular to the long wise wires 48. The cage 44 may be formed of intersecting wires 48 and other shapes or positions, but the cage 44 form of metal wires 48 in a rectangular lattice structure is commonly and readily available for purchase. The purchased cage 44 can be cut to size to fit the mold 46. The embedded cage 44 in the cured mixture does not interfere with the characteristics of the cured mixture, and serves to strengthen the sheet 10. If the panel with the embedded cage 44 is of a size that needs to be caught for placement, the metal cage 44 does not prevent the panel from being cut to size, with the portion of the embedded cage 44 that is in the part of the panel that is being cut away, also being cut away.

If desired, in the formation of a road 25, after the ground is properly prepared, sections of metal cage 44 may be positioned on the prepared ground at desired locations, or one after the other next to each other for as long as desired. The application of the mixture is again as described above with respect to the continuous long sheet 10 for the road 25, but the continuous long sheet 10 now has sections of cage 44 embedded in it.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A sheet for a floor comprising:
a top surface, a bottom surface adapted to be positioned on ground, a first side and a second side, a closed foam cells core between the top surface and the bottom surface in the first side and the second side, the top surface and the bottom surface and the first side and the second side made out of the closed foam cells, the core supporting at least 1000 psi of compressive force, the top surface being at least 2 feet wide by 4 feet long, the sheet weighing less than 40 lbs, and is one continuous flat sheet; and
gravel disposed on the top surface.

2. The sheet of claim 1 wherein the core includes dibutyltin dilaurate, and diphenylmethane.

3. The sheet of claim 2 wherein the core is phthalate free.

4. The sheet of claim 3 which has a rectangular shape.

5. The sheet of claim 4 including an insert disposed in the core.

6. The sheet of claim 5 wherein the insert is metal wiring.

7. The sheet of claim 6 wherein the metal wiring has a shape of a metal cage.

8. A sheet for a road comprising:
a top surface, a bottom surface adapted to be positioned on ground, a first side and a second side, a closed foam cells core between the top surface and the bottom surface in the first side and the second side, the top surface and the bottom surface and the first side and the second side made out of the closed foam cells, the core supporting at least 1000 psi of compressive force, the top surface being at least 40 yards long and 6 feet wide and the sheet being one continuous flat piece; and
gravel disposed on the top surface.

9. The sheet of claim 8 wherein the core includes dibutyltin dilaurate, and diphenylmethane.

10. The sheet of claim 9 wherein the core is phthalate free.

11. The sheet of claim 10 including an insert disposed in the core.

12. The sheet of claim 11 wherein the insert is metal wiring.

13. The sheet of claim 12 wherein the metal wiring has a shape of a metal cage.

\* \* \* \* \*